Patented Jan. 25, 1949

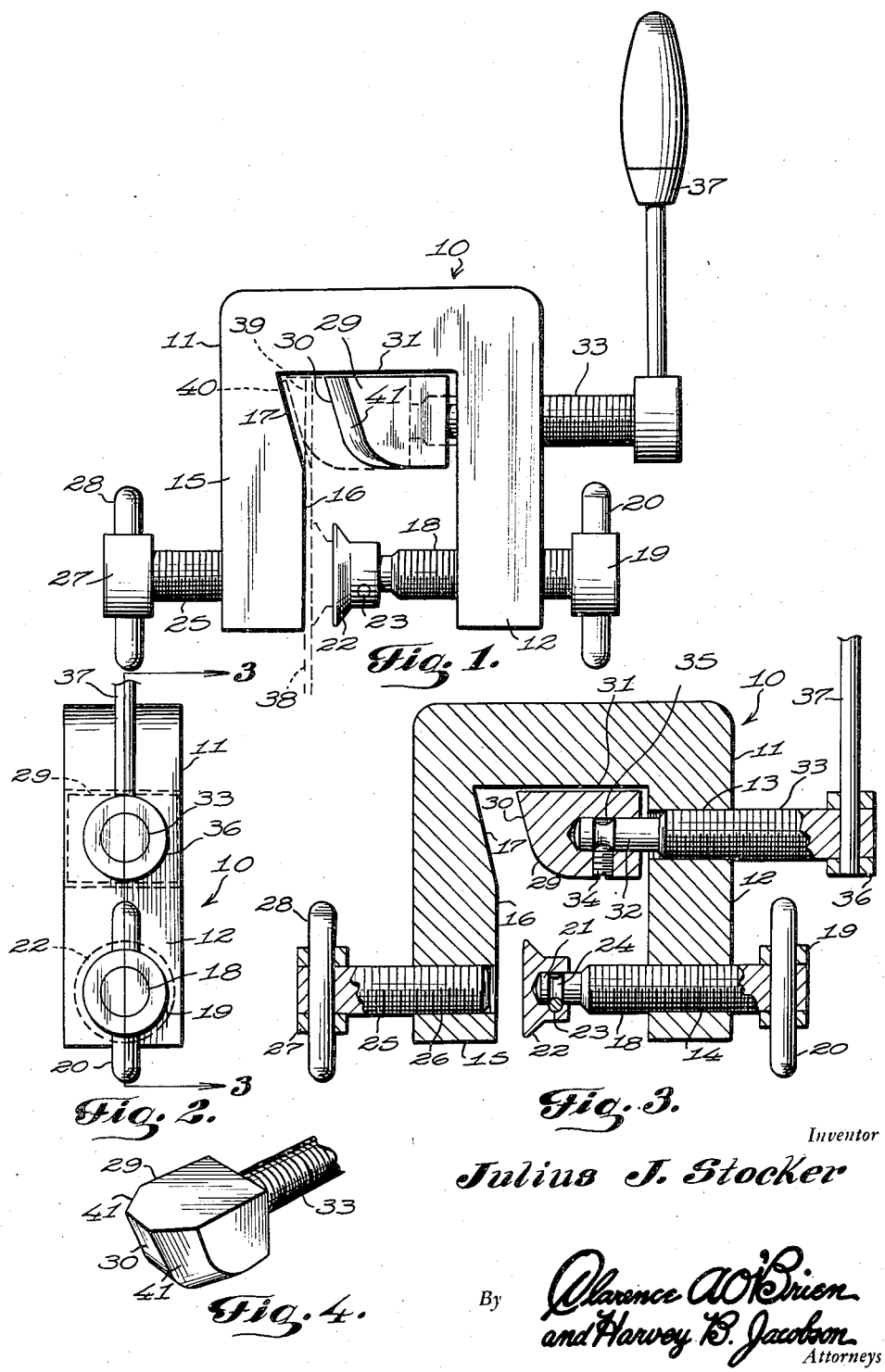

2,460,198

UNITED STATES PATENT OFFICE 2,460,198

SAW SET

Julius J. Stocker, Flanders, N. J.

Application September 13, 1946, Serial No. 696,651

2 Claims. (Cl. 76—60)

This invention relates to new and useful improvements and structural refinements in saw sets, and the principal object of the invention is to provide a device of the character herein described, such as may be conveniently and effectively employed for accurately deflecting or setting the teeth of a saw, as required for efficient use.

A further object of the invention is to provide a saw set which is simple in construction and which may be easily manipulated.

Another object of the invention is to provide a saw set which may be also employed as a convenient clamp.

An additional object of the invention is to provide a saw set which cannot easily become damaged and which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a side elevation of the invention.

Figure 2 is an end view thereof.

Figure 3 is a cross sectional view, taken substantially in the plane of the line 3—3 in Figure 2, and Figure 4 is a perspective view of a setting block used in the invention.

Like characters of reference are used to designate like parts in the specification and throughout the several views.

Referring now to the accompanying drawings in detail, the invention consists of a saw set designated generally by the reference character 10, the same embodying in its construction a substantially U-shaped body 11 provided in one arm 12 thereof with two screw threaded bores 13 and 14.

The second arm 15 of the body 11 is formed on the inner surface 16 thereof with a bevelled recess 17, and constitutes what may be referred to as a stationary jaw, designated by the same reference character 15.

A clamping bolt 18 is positioned in the bore 14 and is formed with an enlarged head 19, which in turn, is equipped with a cross bar 20. The shank of the screw 18 terminates in a reduced portion 21, which is freely rotatable in a pressure pad 22. The pad is rotatably retained on the portion 21 by a pin 23, the latter being secured in the pad and freely engaging an annular groove 24 with which the portion 21 is formed.

An adjusting bolt 25, similar to the aforementioned bolt 18, engages a threaded bore 26 formed in the jaw 15, the bolt 25 being equipped with an enlarged head 27 and with a cross bar 28.

A setting block 29, formed with a bevelled surface 30, is positioned between the arms 12 and 15 of the body 11, the block 29 being in sliding contact, so to speak, with the adjacent surface 31 of the closed end portion of the body, as will be clearly apparent from the accompanying drawings.

The block 29 is rotatably positioned on a reduced shank portion 32 of an actuating screw 33, this being accomplished by providing the block with a set screw 34 which engages an annular groove 35 formed in the shank portion 32.

The screw 33 engages the aforementioned bore 13 and carries at its outer end an enlarged head 36 equipped with a handle 37.

It will be noted that the bolts 18 and 25 are substantially in longitudinal alignment, and when the invention is placed in use, the saw 38 is positioned adjacent the surface 16 of the jaw 15 and is clamped thereat by means of the screw 18. The teeth 39 of the saw may be easily and conveniently deflected or set, by simply manipulating the handle 37 and the associated screw 33 with the block 29, whereby the teeth are pressed into the recess 17 as indicated at 40.

The screw 25 may be employed for spacing the saw 38 from the surface 16, whereby greater or lesser deflection may, of course, be imposed on the saw teeth.

When the invention is not being used for setting saws, it will readily lend itself for use as a convenient clamp, such as is frequently required by carpenters, or the like.

Finally, it should be stated that the block 29 may be chamfered as at 41, so as to facilitate proper engagement thereof with one tooth of the saw at the time.

It is believed that the advantages and use of the invention will be clearly understood from the foregoing disclosure, and accordingly, further description thereof at this time is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A saw set comprising in combination, a sub-

1. A saw set comprising in combination, a substantially U-shaped body, one arm of said body having a bevelled recess formed on the inner surface thereof and constituting a stationary jaw, a clamping bolt provided on the remaining arm of said body, a bevelled setting block positioned between said arms and engageable with said recess, and an actuating screw provided on said remaining arm, said block being pivotally and adjustably mounted on said block.

2. A saw set comprising in combination, a substantially U-shaped body, one arm of said body having a bevelled recess formed on the inner surface thereof and constituting a stationary jaw, a clamping bolt provided on the remaining arm of said body, a pressure pad rotatable at the shank end of said bolt, a bevelled setting block positioned between said arms in sliding contact with the closed end portion of said body, the bevelled portion of said block being engageable with said recess, an actuating screw provided on said remaining arm and rotatably connected to said block, means for adjusting said block in selected pivotal positions on said screw and an adjusting bolt provided in said jaw in longitudinal alignment with said clamping bolt.

JULIUS J. STOCKER.

REFERENCES CITED

The following references are of record in the file of this patent:

UNITED STATES PATENTS

| Number | Name | Date |
|---|---|---|
| 893,140 | Brunett | July 14, 1908 |
| 1,001,880 | Neuroth | Aug. 29, 1911 |
| 1,019,352 | Payton | Mar. 5, 1912 |
| 1,447,112 | Wood | Feb. 27, 1923 |
| 1,448,602 | Smith | Mar. 13, 1923 |

FOREIGN PATENTS

| Number | Country | Date |
|---|---|---|
| 643,960 | France | May 26, 1928 |